(12) United States Patent
Houssat et al.

(10) Patent No.: US 11,772,610 B2
(45) Date of Patent: Oct. 3, 2023

(54) DEVICE FOR CONNECTING A WIPER BLADE TO A DRIVING ARM

(71) Applicant: Valeo Systèmes d'Essuyage, Le Mesnil Saint Denis (FR)

(72) Inventors: Stéphane Houssat, Le Mesnil Saint Denis (FR); Vincent Gaucher, Le Mesnil Saint Denis (FR); Eric Poton, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/815,762

(22) Filed: Jul. 28, 2022

(65) Prior Publication Data

US 2023/0036036 A1    Feb. 2, 2023

(30) Foreign Application Priority Data

Jul. 30, 2021   (FR) ........................................ 2108308

(51) Int. Cl.
*B60S 1/40*   (2006.01)

(52) U.S. Cl.
CPC ............. *B60S 1/4003* (2013.01); *B60S 1/4038* (2013.01); *B60S 1/4048* (2013.01); *B60S 2001/4051* (2013.01); *B60S 2001/4054* (2013.01)

(58) Field of Classification Search
CPC ..... B60S 1/4003; B60S 1/4045; B60S 1/4048; B60S 1/4038; B60S 2001/4051; B60S 2001/4054; B60S 2001/4058
USPC ...................................................... 15/250.32
See application file for complete search history.

(56) References Cited

U.S. PATENT DOCUMENTS

| | | | |
|---|---|---|---|
| 8,707,506 | B1 | 4/2014 | Wu |
| 2012/0060316 | A1 | 3/2012 | Avasiloaie et al. |
| 2013/0104334 | A1* | 5/2013 | Depondt ............... B60S 1/4074 15/250.32 |
| 2015/0089764 | A1 | 4/2015 | Wu |

FOREIGN PATENT DOCUMENTS

| | | |
|---|---|---|
| DE | 102010003269 A1 | 9/2011 |
| DE | 102010030880 A1 | 1/2012 |
| WO | 2016/008523 A1* | 1/2016 |
| WO | 2022/017806 A1 | 1/2022 |

OTHER PUBLICATIONS

Preliminary Search Report and Written Opinion in corresponding French Application No. 2108308, dated Apr. 15, 2022 (8 pages).

* cited by examiner

*Primary Examiner* — Gary K. Graham
(74) *Attorney, Agent, or Firm* — Osha Bergman Watanabe & Burton LLP

(57) ABSTRACT

The invention relates to a connection device (1) for a vehicle, intended to connect a wiper blade to a driving arm, comprising at least one connector configured to be secured to the wiper blade (12) and at least two adapters (25, 29), one of the adapters (25) being configured for connecting the connector (24) to a first type of driving arm, and a combination of the two adapters (25, 29) being configured for connecting the connector to a second type of driving arm (59), characterized in that each of these adapters (25, 29) comprises a locking member (85, 89) configured to lock the combination of the two adapters to the second type of driving arm (59), these locking members (85, 89) being superposed in order to secure the combination of the two adapters (25, 29) to the second type of driving arm (59).

10 Claims, 3 Drawing Sheets

[Fig. 1]
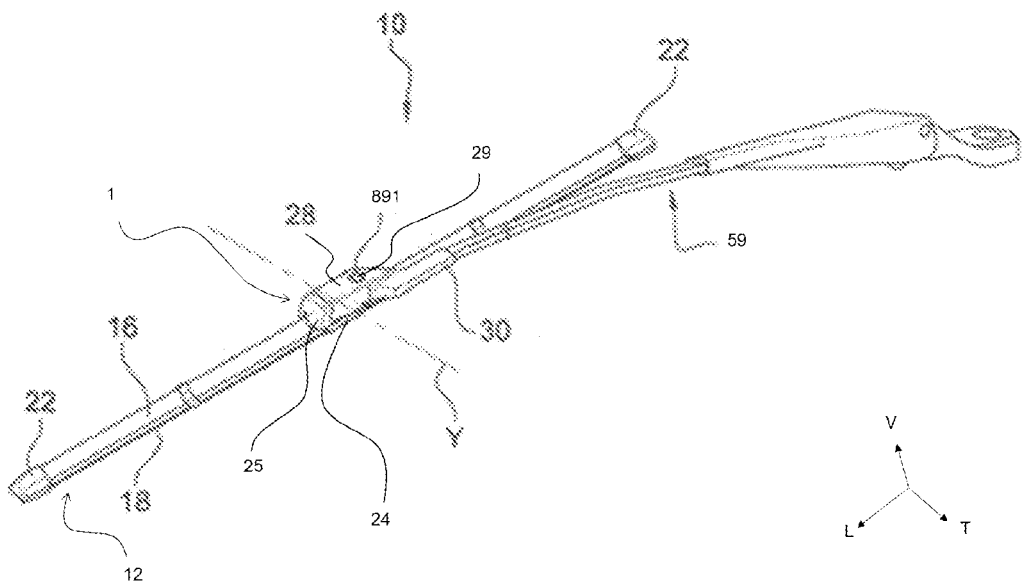
[Fig. 2]
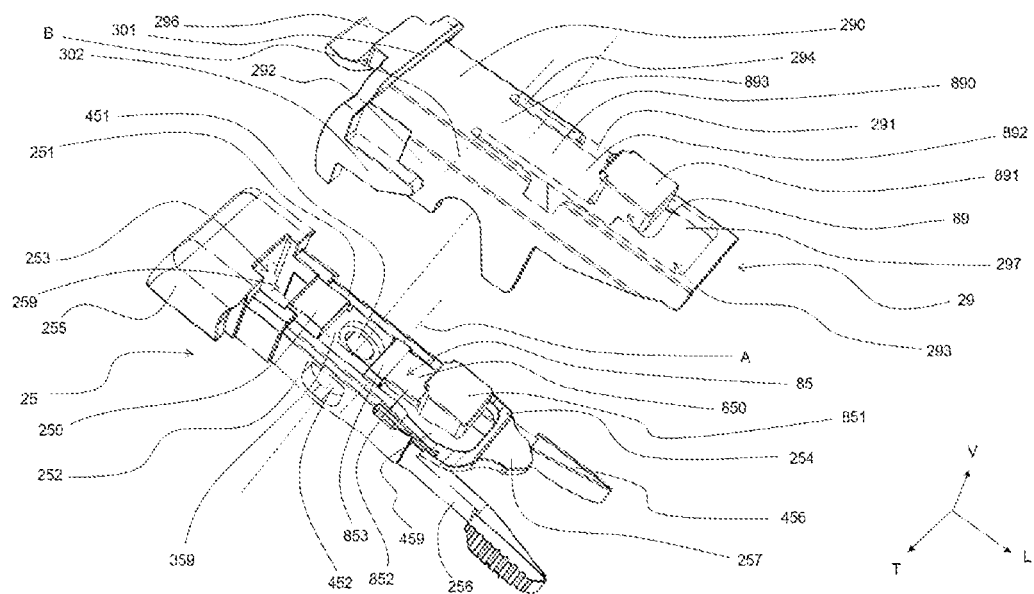

[Fig. 3]
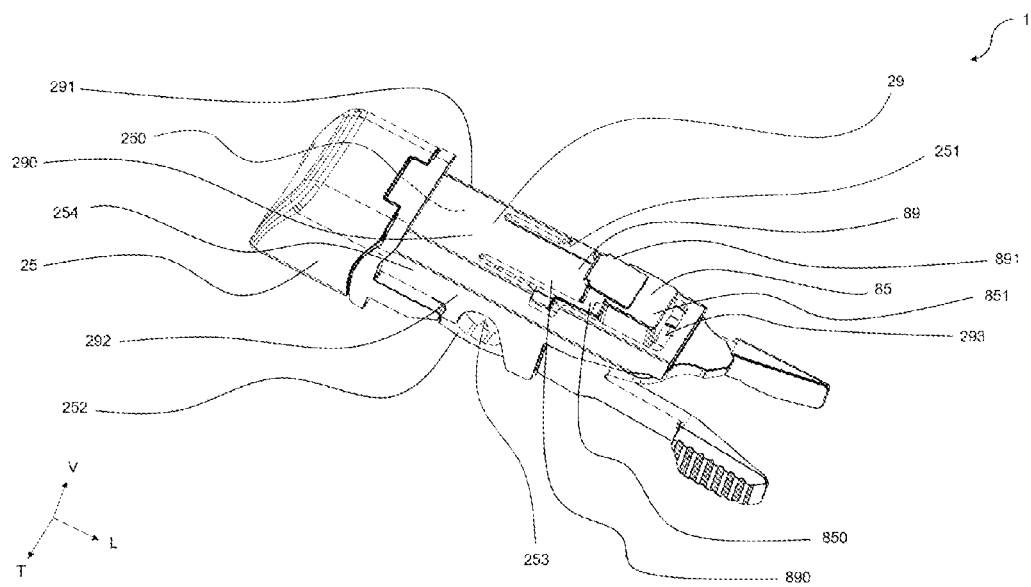
[Fig. 4]
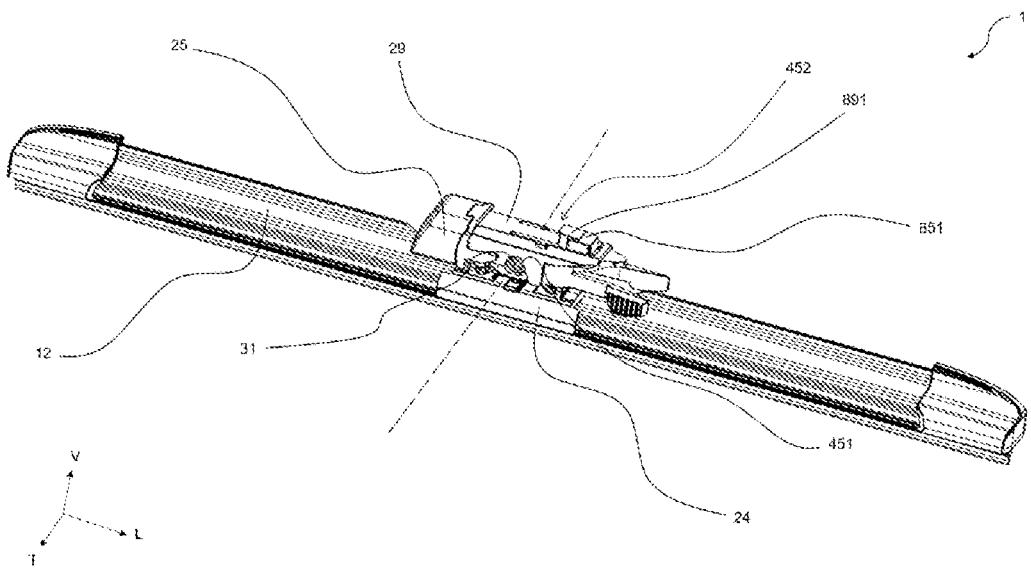

[Fig. 5]
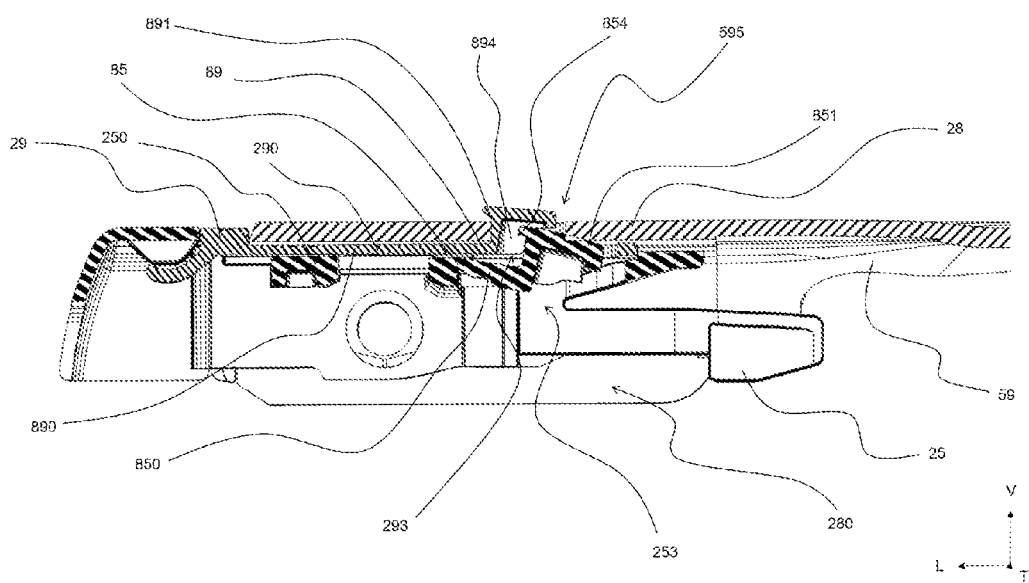

DEVICE FOR CONNECTING A WIPER BLADE TO A DRIVING ARM

The present invention relates to the field of vehicle wipers and more particularly connecting devices allowing a wiper blade to be connected to a driving arm.

Wiper systems for vehicles are designed to remove liquids and dirt, which can disrupt the driver's view of his surroundings, by wiping. These wiper systems generally comprise a driving arm that carries out an angular back-and-forth movement, and elongate wipers which themselves carry blade rubbers made of a resilient material. The blade rubber rubs against the windscreen and removes this liquid and dirt by sweeping it out of the driver's field of view.

The wiper blade is attached to the driving arm by a connection system which comprises a connector and an adapter. The connector is a component that is secured to the wiper blade, and which is generally secured to the blade rubber. The adapter is a component that is interposed between the driving arm and the connector, being configured to fit into an endpiece belonging to the driving arm. The connector and adapter then collaborate to provide an articulated connection and to attach the wiper blade to the driving arm, thus forming the device that connects the wiper blade to the driving arm.

The articulated connection between the connector and the adapter comprises at least one transverse axis of pivoting of the connector with respect to the adapter, which is also an axis of pivoting of the wiper blade with respect to the driving arm. One of the members, for example the connector, generally comprises a substantially cylindrical shape which forms a pivot and which is received in a housing of complementary shape in the other member, in this instance the adapter.

An adapter allows a wiper blade to be combined with a particular type of yoke or driving arm, and there are numerous varieties of endpieces. These varieties are similar in appearance but differ from one another in terms of their dimensions, particularly their width or lateral dimension. They also vary in terms of the positions of the holes designed to interact with a push button for locking of the adapter.

Thus there are different adapters, so as to provide the ability to combine a given wiper blade with a number of endpieces and, by extension, a number of driving arms. A connection device may moreover comprise various adapters able to be combined by fitting inside one another, the combination of these various adapters being capable of being connected to a particular type of driving arm to which each adapter considered separately is unable to be connected, thus increasing the number of assembly options for the one same wiper blade.

The association of one particular type of driving arm with a connection device may thus rely on the collaboration between the locking member positioned on the adapter and the orifice of the driving arm in which it is intended to become lodged. There are many types of driving arm with an orifice formed in the upper wall of the arm, which differ from one another at least in terms of the position of this orifice. Nevertheless, the prior art offers no solution other than to interchange the adapter according to the type of arm desired, thereby leading to a certain level of redundancy in the technical means that define these adapters.

The present invention falls within this context by offering a connection device that allows superposition between the locking member of a first adapter and the locking member of a second adapter which fits onto this first adapter, the combination of these two adapters allowing them to collaborate with a type of driving arm that differs from the type of driving arm with which the first adapter considered in isolation is able to collaborate.

One subject matter of the present invention thus relates to a connection device for a vehicle, intended to connect a wiper blade to a driving arm, comprising at least one connector configured to be secured to the wiper blade and at least two adapters, one of the adapters being configured for connecting the connector to a first type of driving arm, and a combination of the two adapters being configured for connecting the connector to a second type of driving arm. According to the invention, each of these adapters comprises a locking member configured to lock the combination of the two adapters to the second type of driving arm, these locking members being superposed in order to secure the combination of the two adapters to the second type of driving arm.

The connection device therefore comprises at least one connector and at least two adapters. This connector provides the connection between the connection device and the wiper blade, while the adapters contribute to connecting this connector to a particular type of driving arm. One of the adapters has a configuration such that it contributes to connecting the connector to a first type of driving arm. However, when joined by another adapter as proposed by the invention, the combination formed by these two adapters contributes to connecting the connector to a second type of driving arm distinct from the first type of driving arm.

These adapters are able to collaborate with the driving arm designed to receive this combination of adapters by means of their superposed locking members, each adapter comprising one such locking member. When the adapters are being assembled to form the combination capable of contributing to connecting the connector to the second type of driving arm, the locking member of one of the adapters becomes superposed with the locking member of the other adapter, securing the wiper blade to the driving arm.

According to one feature of the invention, the locking members are retractable between an immobilizing position intended to immobilize the adapters with respect to the second type of driving arm and a mounting position intended to allow a translation of the adapters relative to the second type of driving arm.

The immobilization, or locking, corresponds to an engagement of a portion of the locking members in an opening, for example an orifice or a hole, pierced in a wall of a yoke of the driving arm. When the locking members are in an adapter-immobilizing position, these locking members prevent the translation of the connection device in a longitudinal direction, which corresponds to a direction of elongation of this connection device. Conversely, when the locking members are in an adapter-mounting position, such translation is facilitated. The connection device effectively needs to be able, in order to be able to be mounted in the driving arm, to slide therein.

In the immobilizing position, the locking members project from the connection device. What is meant by project is that the locking member of one of the adapters extends beyond the plane in which an upper wall of this adapter mainly extends, and that the locking member of the other adapter extends beyond the plane in which an upper wall of this other adapter mainly extends. Such projections constitute end-stop means which prevent the translation of the connection device. By contrast, in the mounting position, the locking members no longer project and are thus retracted and the sliding of the connection device in the yoke of the driving arm is therefore facilitated.

According to another feature of the invention, each locking member comprises a flexible tongue and a push-button positioned at a free end of the flexible tongue.

These tongues are flexible in the sense that they are elastically deformable within their elastic domain, notably allowing the locking members to retract and then return to a position referred to as an immobilizing position.

According to another feature, the flexible tongues of the locking members are able to be superposed, and are superposed when the two adapters are nested together.

According to one feature, the push-buttons of the locking members are able to be superposed, and are superposed when the two adapters are nested together. It will be appreciated that the push-button of one of the adapters may therefore, at least partly, and notably vertically, cover the push-button of the other adapter.

When the locking members of the adapters are not superposed, they are both in a position of rest. What is meant by a position of rest is that the flexible tongues of these locking members are not elastically deformed, which is to say that they extend substantially in the planes of or above the upper walls of the adapters that comprise them. Conversely, when the locking members are superposed, the push-button of the second adapter at least partially covers the push-button of the first adapter. This push-button of the second adapter therefore comes into abutment against the push-button of the first adapter and forces this flexible tongue of the second adapter to leave the plane in which the upper wall of the second adapter extends.

According to another feature, the adapters comprise a first adapter and a second adapter, the push-button of the first adapter being intended to become lodged in an orifice of a yoke of the first type of driving arm, and the push-buttons of the first adapter and of the second adapter are intended to extend at least in part into a hole of a yoke of the second type of driving arm.

The push-button of the first adapter is configured to become lodged in an orifice made in the yoke of the first type of driving arm, thus securing the first adapter to this first type of driving arm. In the presence of a combination of two adapters, as is the case in the present connection device, the push-buttons of each of the adapters become lodged, at least in part, in a hole made in the yoke of the second type of driving arm. These two push-buttons therefore contribute to immobilizing the connection device in terms of translation. The two push-buttons extend into the hole formed in the yoke of the second type of driving arm such that the push-button of the second adapter projects above the upper wall of the yoke of the second type of driving arm, while the push-button of the first adapter extends at least in the thickness of this upper wall, for example extending into a cavity delimited by the push-button of the second adapter.

According to one feature of the invention, the push-button of the first adapter is in contact with the push-button of the second adapter when the locking members are superposed.

Such superposition allows the combination of the adapters to be secured to the second type of driving arm.

The push-button of the second adapter comes into abutment against the push-button of the first adapter. Such abutment elastically deforms the flexible tongue on which the push-button of the second adapter is positioned. In the same way, when the connection device is in the immobilizing position in the driving arm, the abutment of the push-button of the second adapter against the push-button of the first adapter elastically deforms the flexible tongue of the first adapter. The push-button of the first adapter is therefore at least partially retracted, which is to say has not returned to its position of rest.

According to another feature, each adapter has a U-shaped cross section which delimits a housing, one of the adapters being positioned in the housing of the other adapter. The adapters, which are therefore components that are substantially U-shaped in cross section, may thus fit one inside the other. One U-shaped adapter may cover another U-shaped adapter, making it easier to combine a number of adapters within the one same connection device.

According to one feature of the invention, the adapters are combined with one another by removably fitting into one another. The adapters may thus be associated and dissociated with ease, respectively by fitting one of them into the housing of the other and by disengaging one with respect to the other. Such removable fitting-together may notably involve a clip-fastening.

The invention also relates to a wiper blade comprising a connection device as described above.

The invention moreover relates to a wiping system comprising a driving arm bearing a wiper blade comprising a connection device, the wiper blade being connected to the driving arm by means of the connection device described hereinabove.

Further features, details and advantages of the invention will emerge more clearly on reading, on the one hand, the following description, and, on the other hand an exemplary embodiment provided by way of illustrative non-limiting example with reference to the attached drawings in which:

FIG. 1 is a schematic perspective view of a wiping system in which a connection device according to the invention connects a wiper blade to a driving arm;

FIG. 2 is a perspective view of a first adapter and of a second adapter that make up the connection device of FIG. 1;

FIG. 3 is a perspective view of a combination of the first adapter and of the second adapter of FIG. 2, the first adapter being fitted in the second adapter;

FIG. 4 is a perspective view of the connection device of FIG. 1, secured to a wiper blade;

FIG. 5 is a view in section of the combination of the first adapter and of the second adapter of FIG. 3, the combination being mounted in a second type of driving arm.

In the figures, elements that are common to several figures retain the same references.

In the following detailed description, the terms "longitudinal", "transverse" and "vertical" refer to the orientation of the connection device according to the invention. A longitudinal direction corresponds to a main direction of elongation of the wiper blade to which the connection device is secured, this longitudinal direction being parallel to a longitudinal axis L of a coordinate system L, V, T illustrated in the figures. A vertical direction corresponds to a direction in which the locking members are superposed, this vertical direction being parallel to a vertical axis V of the coordinate system L, V, T, and this vertical axis V being perpendicular to the longitudinal axis L. Finally, a transverse direction corresponds to a direction parallel to a transverse axis T of the coordinate system L, V, T, this transverse axis T being perpendicular to the longitudinal axis L and to the vertical axis V.

Furthermore, references to "lower" and "upper" with regard to the elements of the connection device, mean relative to the remoteness of these elements from the wiper blade, a lower end of such elements corresponding to the end positioned in the vicinity of this wiper blade, while an upper end corresponds to the end positioned distant from the wiper blade.

FIG. 1 thus illustrates a wiping system 10 according to the invention, comprising a wiper blade 12 and a driving arm 59 for driving the wiper blade 12. The wiper blade 12 comprises a longitudinal body 16, a blade rubber 18, generally made of rubber, and at least one vertebra (not visible) which stiffens the blade rubber 18 and encourages it to press against a vehicle windscreen.

The schematically depicted wiper blade 12 further comprises end fittings or clips 22 for attaching the wiper blade rubber 18 and the vertebra to the longitudinal body 16, these end fittings 22 being situated at each of the longitudinal ends of the longitudinal body 16.

The wiper blade 12 bears, substantially at its middle, a connection device 1 according to the invention. This connection device 1 notably comprises a connector 24 and at least two adapters.

These at least two adapters, in this instance a first adapter 25 and a second adapter 29 contribute to connecting the connector 24 to one particular type of driving arm, which in this instance is a second type of driving arm 59. The adapters 25 and 29 are mounted on the connector 24 in such a way as to maintain a degree of freedom to pivot about an axis of articulation Y which is a transverse axis substantially perpendicular to the longitudinal axis of the wiper blade 12. This degree of freedom allows the wiper blade 12 to pivot with respect to the driving arm 59 and thus allows the wiper blade 12 to follow the curvature of the windscreen as it moves. The adapters 25 and 29 can be detached from the driving arm 59, for example by pressing an actuation button, in this case a push-button 891, borne by the second adapter 29.

The driving arm 59 is driven by a motor, not depicted, to follow an angular back-and-forth movement that allows water and possibly other undesirable elements with which the windscreen is covered to be removed. The adapters 25 and 29 provide the connection between the wiper blade 12 and the driving arm 59. More specifically, they contribute to connecting a head or yoke 28 belonging to the driving arm 59, and which may be formed as one piece with the driving arm 59 or else may be attached and fixed to a rod thereof.

The yoke 28 has an elongate shape in an overall direction substantially parallel to the longitudinal direction of the wiper blade 12. The yoke 28 is extended at one of its longitudinal ends by a connecting part 30 for connecting to the rod of the driving arm 59.

FIG. 2 is a perspective view of the first adapter 25 and of the second adapter 29 that make up the connection device 1 of FIG. 1.

The first adapter 25 extends mainly in the longitudinal direction, and has a substantially U-shaped transverse cross section. This first adapter 25 may notably, when it constitutes the only adapter of a connection device, contribute to connecting the connector 24 to a first type of driving arm, not illustrated in this figure. It may also, when used in combination with the second adapter 29, contribute to connecting the connector 24 to a second type of driving arm, the driving arm 59 of FIG. 1.

This first adapter 25 has a body 254 which comprises a first lateral wall 251 and a second lateral wall 252 these walls being substantially mutually parallel and distant from one another. These walls 251, 252 are connected to one another by an upper wall 250 substantially perpendicular to them. The walls 250, 251, 252 of this first adapter 25 have a shape that is elongated in the longitudinal direction, and between them they define an internal housing 253 intended to accommodate the connector 24.

The lateral walls 251 and 252 are moreover respectively equipped with a first through-orifice 451 and with a second through-orifice 452 which open onto the internal housing 253. The first orifice 451 is substantially circular, while the second orifice 452 is substantially parallelepipedal. These orifices 451 and 452 define an axis of pivoting of the first adapter 25 relative to the connector 24, this not being depicted in this figure, and, by extension, of the wiper blade 12 connected to the first adapter 25 relative to the driving arm connected to the connector 24.

At one of its longitudinal ends, the body 254 of the first adapter 25 is connected to a head 255, the vertical and transverse dimensions of which are greater than those of the body 254 of the first adapter 25. It will thus be appreciated that the head 255 extends beyond a longitudinal and transverse plane in which the upper wall 250 extends, and beyond a longitudinal and vertical plane in which the lateral walls 251 and 252 extend. The head 255 is notably a locking means. More specifically, when the wiper blade 12 is assembled on the driving arm 59 via the connection device 1 as illustrated in FIG. 1, this head 255 forms an end-stop for the yoke 28 of the driving arm 59, thus preventing the translation of this yoke beyond the body 254 of the first adapter 25.

At another of its longitudinal ends, the upper wall 250 of the first adapter 25 narrows to a point 257 which overhangs beyond the body 255. At this other longitudinal end, the body 254 of the first adapter 25, and more particularly the lateral walls 251, 252, are each continued in the form of an elastically deformable leg 256. These legs 256 may thus be brought closer together by elastic deformation. The legs 256 are substantially symmetrical about a plane of symmetry extending in longitudinal and vertical directions and situated equidistantly from the first lateral wall 251 and from the second lateral wall 252. Each leg 256 furthermore has a locking portion 456 configured to collaborate with cutouts in the yoke 28 of a driving arm 59 so as to lock the assembly of the first adapter 25 therewith, thus constituting another locking means.

The upper wall 250 is pierced with a first opening 259, a second opening 359 and a third opening 459 which are aligned in the longitudinal direction and open onto the internal housing 253. The third opening 459, which is in the vicinity of the legs 256, is partially covered by a locking member 85. This locking member 85 notably comprises a flexible tongue 850 and a push-button 851. This tongue 850 extends mainly in the longitudinal direction and has a fixed end 853 some distance from the legs 256, which is connected to the lateral wall 251 and to the lateral wall 252 by a bridge of material, and a free end 852, which is able to move, in the vicinity of the legs 256. The tongue 850 is elastically deformable, and its free end 852 bears the push-button 851. The tunnel 850 and the push-button 851 may thus pivot about an axis A, situated at the fixed end 853 which therefore acts as a hinge for the locking member. When at rest, which is to say without constraint, the tongue 850 is positioned such that the push-button 851 is located above the plane in which the upper wall 250 extends. What is meant by that is that the push-button 851 is some distance from this upper wall 250 of the first adapter 25 in the vertical direction, in the direction away from the internal housing 253. When the first adapter 25 is being mounted by translational movement in a yoke of a first type of driving arm, the push-button 851 retracts to slide in this yoke and engages by elastic clip-fastening into a corresponding orifice belonging to the yoke in which it becomes lodged in order to lock the first adapter 25 relative to this yoke.

The second adapter 29 is a component of which a transverse cross section is substantially U-shaped. This second adapter 29 comprises an upper wall 290 as well as a first lateral wall 291 and a second lateral wall 292. The upper wall 290 extends mainly in a longitudinal direction and in a transverse direction, while the lateral walls 291 and 292 extend mainly in a longitudinal direction and a vertical direction. The lateral walls 291 and 292 are thus mutually parallel and are perpendicular to the upper wall 290. These walls 290, 291 and 292 define an internal housing 293, this internal housing notably being able to accept a connector 24 or another adapter. The second adapter 29 has a shoulder 301 which comprises a curved tab 296 extending from one of the longitudinal ends of the second adapter 29 and away therefrom. This curved tab 296 contributes to the assembling of the second adapter 29 with other components, and notably with other adapters, such as the first adapter 25 for example. Specifically, this first adapter 25 has, on one of the internal faces of its head 255 which is not visible in FIG. 2, an internal portion able to accept this curved tab 296 of the second adapter 29, thus forming a locking means.

The shoulder 301 of the longitudinal end of the second adapter 29 which comprises the curved tab 296 is extended, away from this curved tab 296, by two lugs 302 which are pressed intimately against the lateral walls 291 and 292. These lugs 302 allow the second adapter 29 to be anchored to a driving arm, and in this respect constitute other locking means.

The upper wall 290 of the second adapter 29 is pierced with two parallel slots 294, positioned on the upper wall 290 in the vicinity of each of the lateral walls 291 and 292. These parallel slots 294 are aligned in the transverse direction and open onto the internal housing 293. These parallel slots 294, at a longitudinal end of the second adapter 29 that does not bear the curved tab 296, open onto an opening 297 which is likewise pierced in the upper wall 290. This opening 297 is partially covered by a locking member 89 that forms part of the second adapter 29. This locking member 89 notably comprises a flexible tongue 890 and a push-button 891. This tongue 890 is connected to the upper wall 290 of the second adapter 29 by a first end 893, and has a free end 892, at a distance from the longitudinal end that bears the curved tab 296 that is greater than the distance separating this curved tab 296 from the first end 893. The tongue 890 is elastically deformable, and its free end 892 bears the push-button 891. The tongue 890 and the push-button 891 may thus pivot about an axis B, situated at the fixed first end 893 which acts as a hinge. When at rest, which is to say without constraint, the tongue 890 is positioned such that the push-button 891 is located above the plane in which the upper wall 290 extends. It will be appreciated that the push-button 891 is some distance from this upper wall 290 in the vertical direction, in the direction away from the internal housing 293.

FIG. 3 is a perspective depiction of a combination of the first adapter 25 and of the second adapter 29 of FIG. 2. These two adapters 25 and 29 are depicted here as being fitted together, such as they are in the connection device 1 according to the invention. This is a removable fitting-together, which means to say that the adapters 25 and 29 can be associated and dissociated by turns, without either the one or the other being destroyed. This removable fitting-together may for example be a clip-fastening. Since the first adapter 25 and the second adapter 29 both have U-shaped cross sections which delimit their respective internal housings 253 and 293, these adapters 25 and 29 can fit one inside the other. In this instance it is the first adapter 25 that is positioned in the internal housing 293 of the second adapter 29.

When the first adapter 25 and the second adapter 29 are thus combined, the second adapter 29 covers the first adapter 25 so that its lateral walls 291, 292 are positioned facing the lateral walls 251, 252 of the first adapter 25. The upper wall 290 of the second adapter 29 partially covers the upper wall 250 of the first adapter 25, this second adapter 29 resting on the body 254 of the first adapter 25.

The locking member 89 of the second adapter 29 is superposed with the locking member 85 of the first adapter 25, thus allowing the combination of these adapters 25 and 29 to be secured to the second type of driving arm 59, depicted in FIG. 5. The tongue 890 of the second adapter 29 covers the tongue 850 of the first adapter 25. In the same way, since the push-buttons 851 and 891 are able to be superposed, the push-button 891 of the second adapter 29 at least partially covers the push-button 851 of the first adapter 25.

In FIG. 4, the combination of the first adapter 25 and the second adapter 29, which combination is as described hereinabove, is associated with a connector 24 to form a connection device 1 according to the invention. This connection device 1 here is secured to a wiper blade 12. The first adapter 25 comprises at least one pivot connection 31 mechanically connecting it to the connector 24 at its orifices 451 and 452. This pivot connection 31 constitutes an articulation that allows the connector 24 to rotate with respect to the first adapter 25. Thus, when the connector 24 is secured to a wiper blade 12 as it is in this figure, for example by crimping, this wiper blade 12 is able to pivot with respect to the first adapter 25 and to the driving arm 59 to which this first adapter 25 is connected. As a result, the wiper blade 12 can, in its movements, perfectly follow the curved surface of the windscreen of the vehicle to which it is fitted.

FIG. 5 is a view in section of the combination of the first adapter 25 and of the second adapter 29 of FIG. 3, this combination being illustrated here as being mounted in the second type of driving arm 59, and more particularly in the yoke 28 of this second type of driving arm 59.

The locking member 85 of the first adapter 25 and the locking member 89 of the second adapter 29 are retractable between an immobilization position immobilizing the adapters 25 and 29 with respect to the second driving arm 59 and a mounting position for mounting these adapters 25 and 29 with respect to this second driving arm 59. The mounting position corresponds to the position that the locking members 85 and 89 adopt when the adapters 25 and 29 are in the process of being inserted into the driving arm 59 and, more specifically, into the yoke 28 of this driving arm 59. The immobilization position itself corresponds to the position that the locking members 85 and 89 adopt once the adapters 25 and 29 have been mounted in this yoke 28 of the driving arm 59, the translation of the adapters 25 and 29 in a longitudinal direction then being prevented by the locking members 85 and 89 combined with one another.

In the mounting position, the flexible tongues 850 and 890 of the locking members 85 and 89 are elastically deformed in such a way that the tongue 850 no longer lies in the same plane as the upper wall 250 of the first adapter 25, and likewise in such a way that the tongue 890 no longer lies in the same plane as the upper wall 290 of the second adapter 29. The push-buttons 851 and 891 therefore retract into the internal housings 253 and 293 respectively, and therefore no longer project from these planes. The adapters 25 and 29 which they equip can therefore be inserted into the yoke 28 of the driving arm 59 without the translational movement necessary for such insertion being blocked by these projections.

Conversely, in the immobilization position as depicted in FIG. 5, the push-buttons 851 and 891 project from the planes in which the upper walls 250 and 290 of their respective adapters extend. The tongue 890 of the second adapter 29 is aligned, in the longitudinal direction, with the upper wall 290 of the second adapter 29; both of these lying in the same plane. The tongue 850 of the first adapter 25 is not, however, aligned with the upper wall 250 of this adapter in the longitudinal direction. This tongue 850 of the first adapter 25 is actually elastically deformed such that the push-button 851 that it bears is at least partially retracted into the internal housing 253 of the first adapter 25.

When the locking members 85 and 89 are in the immobilization position, the push-buttons 851 and 891 extend at least partially into a hole 595 in the yoke 28 of the second driving arm 59. The locking members 85 and 89 are superposed so as to secure the combination of the adapters 25 and 29 to the driving arm 59, the push-button 851 of the first adapter 25 being in contact with the push-button 891 of the second adapter 29. This push-button 85 of the first adapter 25 pushes the push-button 89 of the second adapter 29 through the hole 595 towards the outside of a receiving cavity 280 of the yoke 28 in which the adapters 25 and 29 are situated. The push-button 891 of the second adapter 29 comes into abutment with the thickness of the upper wall of the yoke 28 at the hole 595, whereas the push-button 851 of the first adapter 25 extends in the thickness of this upper wall of the yoke 28. In particular, a nose 854 of the push-button 851 of the first adapter 25 extends into a cavity 894 of the push-button 891 of the second adapter 29. In this way, the push-buttons 851 and 891 contribute to blocking the translation of the adapters 25 and 29 in the longitudinal direction within the second driving arm 59.

The present invention thus proposes a connection device wherein the superposition of the locking members of a first adapter and of a second adapter allows a wiper blade to be connected to a particular type of driving arm, such a driving arm being different from the type of driving arm with which the first adapter, on its own, is able to collaborate.

However, the present invention is not limited to the means and configurations described and illustrated herein and it also extends to all equivalent means and configurations and to any technically functional combination of such means.

The invention claimed is:

1. A connection device for a vehicle, configured to connect a wiper blade to a driving arm, comprising:
   at least one connector configured to be secured to the wiper blade; and
   at least two adapters, one of the adapters being configured for connecting the connector to a first type of driving arm, and a combination of the two adapters being configured for connecting the connector to a second type of driving arm,
   wherein each of the two adapters comprises a locking member configured to lock the combination of the two adapters to the second type of driving arm, these locking members being superposed in order to secure the combination of the two adapters to the second type of driving arm,
   wherein the locking members are retractable between an immobilizing position configured to immobilize the adapters with respect to the second type of driving arm and a mounting position configured to allow a translation of the adapters relative to the second type of driving arm.

2. The connection device according to claim 1, wherein each locking member comprises a flexible tongue and a push-button positioned at a free end of the flexible tongue.

3. The connection device according to claim 2, wherein the push-buttons of the locking members are able to be superposed with one another.

4. The connection device according to claim 3, wherein the adapters comprise a first adapter and a second adapter, the push-button of the first adapter being intended to become lodged in an orifice of a yoke of the first type of driving arm, and wherein the push-buttons of the first adapter and of the second adapter are configured to extend at least in part into a hole of a yoke of the second type of driving arm.

5. The connection device according to claim 4, wherein the push-button of the first adapter is in contact with the push-button of the second adapter when the locking members are superposed.

6. The connection device as claimed in claim 1, wherein each adapter has a U-shaped cross section which delimits a housing, one of the adapters being positioned in the housing of the other adapter.

7. The connection device according to claim 1, wherein the adapters are combined with one another by removably fitting into one another.

8. A wiper blade comprising a connection device according to claim 1.

9. A wiping system comprising a driving arm bearing a wiper blade according to claim 8, the wiper blade being connected to the driving arm by the connection device.

10. A connection device for a vehicle, configured to connect a wiper blade to a driving arm, comprising:
    at least one connector configured to be secured to the wiper blade; and
    at least two adapters, one of the adapters being configured for connecting the connector to a first type of driving arm, and a combination of the two adapters being configured for connecting the connector to a second type of driving arm,
    wherein each of the two adapters comprises a locking member configured to lock the combination of the two adapters to the second type of driving arm, the locking members being superposed in order to secure the combination of the two adapters to the second type of driving arm, and
    wherein each locking member comprises a flexible tongue and a push-button positioned at a free end of the flexible tongue.

* * * * *